(12) United States Patent
Gorman et al.

(10) Patent No.: US 11,861,695 B2
(45) Date of Patent: *Jan. 2, 2024

(54) DATA RECONCILIATION BASED ON COMPUTER ANALYSIS OF DATA

(71) Applicant: Xero Limited, Wellington (NZ)

(72) Inventors: Kieran Gorman, Brooklyn, NY (US); Craig Walker, New York, NY (US)

(73) Assignee: Xero Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,471

(22) Filed: Jun. 28, 2022

(65) Prior Publication Data

US 2022/0405836 A1 Dec. 22, 2022

Related U.S. Application Data

(63) Continuation of application No. 17/135,597, filed on Dec. 28, 2020, now Pat. No. 11,410,229, which is a
(Continued)

(51) Int. Cl.
*G06Q 40/02* (2023.01)
*G06Q 40/00* (2023.01)
*G06N 20/00* (2019.01)

(52) U.S. Cl.
CPC ............. *G06Q 40/02* (2013.01); *G06Q 40/00* (2013.01); *G06N 20/00* (2019.01)

(58) Field of Classification Search
CPC ...... G06Q 40/00; G06Q 40/02; G06Q 40/025; G06Q 40/12; G06Q 40/40; G06Q 20/4016; G06N 20/00
See application file for complete search history.

(56) References Cited

U.S. PATENT DOCUMENTS 7,587,348 B2  9/2009 Liao et al.
8,285,639 B2  10/2012 Eden et al.
(Continued)

FOREIGN PATENT DOCUMENTS

AU      2015100617 A4 *  6/2015  ............. G06Q 40/02

OTHER PUBLICATIONS

Costa et al. "Data Mining for Effective Risk Analysis in a Bank Intelligence Scenario" 2007 IEEE 23rd International Conference on Data Engineering Workshop (pp. 904-911) (Year: 2007).*
(Continued)

*Primary Examiner* — Kelly S. Campen
(74) *Attorney, Agent, or Firm* — Schwegman Lundberg & Woessner, P.A.

(57) ABSTRACT

Methods, systems, and computer programs are presented for reconciling a transaction against data in a database to identify the transaction parameters based on text descriptors provided for the transaction. One method includes an operation for identifying features for reconciling transactions of a first entity by a machine-learning program. The features include, at least, a description of the transaction, a name of a second entity in the transaction, a location of the second entity, and an account for the transaction. The machine-learning program is trained with training data that includes values of the features for previously reconciled transactions. A received first transaction includes a description, a date, and an amount. The first transaction is input for the machine-learning program, which generates one or more suggestions for reconciling the first transaction. Each suggestion includes the name of the second entity in the first transaction and an account.

20 Claims, 12 Drawing Sheets

Related U.S. Application Data continuation of application No. 16/027,109, filed on Jul. 3, 2018, now Pat. No. 10,949,916.

(60) Provisional application No. 62/529,191, filed on Jul. 6, 2017.

(56) References Cited

U.S. PATENT DOCUMENTS

| | | |
|---|---|---|
| 8,484,700 B2 | 7/2013 | Hulten et al. |
| 8,571,985 B1 | 10/2013 | Grigg et al. |
| 9,443,268 B1 | 9/2016 | Kapczynski et al. |
| 9,753,962 B2 | 9/2017 | Petschulat et al. |
| 9,898,741 B2* | 2/2018 | Siegel ............... G06Q 20/4016 |
| 9,973,465 B1* | 5/2018 | Linkous ............... H04L 51/234 |
| 10,033,611 B1* | 7/2018 | Linkous ............... H04L 67/1095 |
| 10,269,062 B2* | 4/2019 | Abernethy ............. G06Q 40/02 |
| 10,949,916 B2 | 3/2021 | Gorman et al. |
| 11,087,395 B2* | 8/2021 | Abernethy ............. G06Q 40/02 |
| 11,410,229 B2 | 8/2022 | Gorman et al. |
| 2007/0226129 A1 | 9/2007 | Liao et al. |
| 2007/0243934 A1 | 10/2007 | Little |
| 2008/0009344 A1 | 1/2008 | Graham et al. |
| 2008/0222038 A1 | 9/2008 | Eden et al. |
| 2009/0104954 A1 | 4/2009 | Weber et al. |
| 2009/0222364 A1 | 9/2009 | Mcglynn et al. |
| 2010/0041470 A1 | 2/2010 | Preisach |
| 2011/0271329 A1 | 11/2011 | Hulten et al. |
| 2013/0311266 A1 | 11/2013 | Vichich et al. |
| 2013/0317954 A1 | 11/2013 | Psota et al. |
| 2014/0074762 A1* | 3/2014 | Campbell ............... G06Q 40/00 706/46 |
| 2014/0358745 A1* | 12/2014 | Lunan ................... G06Q 40/12 705/30 |
| 2015/0026061 A1* | 1/2015 | Siegel ............... G06Q 20/4016 705/44 |
| 2015/0073907 A1 | 3/2015 | Purves et al. |
| 2015/0081481 A1 | 3/2015 | Brereton et al. |
| 2015/0081482 A1 | 3/2015 | Brereton et al. |
| 2015/0081542 A1 | 3/2015 | Brereton et al. |
| 2015/0081543 A1 | 3/2015 | Brereton et al. |
| 2015/0242944 A1 | 8/2015 | Willard et al. |
| 2015/0324715 A1 | 11/2015 | Nelson et al. |
| 2015/0324930 A1* | 11/2015 | Abernethy ............. G06Q 40/12 705/30 |
| 2016/0034863 A1 | 2/2016 | Ross |
| 2016/0078408 A1 | 3/2016 | Vo et al. |
| 2016/0217406 A1 | 7/2016 | Najmi |
| 2016/0239813 A1 | 8/2016 | Ko |
| 2017/0046400 A1* | 2/2017 | Erenrich ............. G06F 16/2465 |
| 2017/0116315 A1 | 4/2017 | Xiong et al. |
| 2017/0124669 A1 | 5/2017 | Finkel et al. |
| 2017/0140469 A1 | 5/2017 | Finkel et al. |
| 2017/0286962 A1 | 10/2017 | Lai et al. |
| 2018/0225667 A1 | 8/2018 | Wang et al. |
| 2018/0247156 A1* | 8/2018 | Holtham ................. G06F 18/22 |
| 2018/0247227 A1* | 8/2018 | Holtham ................. G06N 7/01 |
| 2018/0349776 A1 | 12/2018 | Raamadhurai et al. |
| 2019/0005408 A1 | 1/2019 | Tolpin et al. |
| 2019/0005590 A1 | 1/2019 | Li et al. |
| 2019/0012733 A1 | 1/2019 | Gorman et al. |
| 2019/0236693 A1* | 8/2019 | Abernethy ............. G06Q 40/02 |
| 2021/0073922 A1* | 3/2021 | Wang ................. G06Q 10/0639 |
| 2021/0118047 A1 | 4/2021 | Gorman et al. |
| 2021/0342938 A1* | 11/2021 | Abernethy ............. G06Q 40/02 |

OTHER PUBLICATIONS

"U.S. Appl. No. 16/027,109, Examiner Interview Summary dated Jan. 31, 2020", 3 pgs.
"U.S. Appl. No. 16/027,109, Examiner Interview Summary dated Feb. 6, 2020", 3 pgs.
"U.S. Appl. No. 16/027,109, Final Office Action dated Feb. 21, 2019", 19 pgs.
"U.S. Appl. No. 16/027,109, Final Office Action dated Nov. 25, 2019", 25 pgs.
"U.S. Appl. No. 16/027,109, Non Final Office Action dated Mar. 27, 2020", 26 pgs.
"U.S. Appl. No. 16/027,109, Non Final Office Action dated Jul. 8, 2019", 20 pgs.
"U.S. Appl. No. 16/027,109, Non Final Office Action dated Sep. 26, 2018", 13 pgs.
"U.S. Appl. No. 16/027,109, Response filed May 20, 2019 to Final Office Action dated Feb. 21, 2019", 18 pgs.
"U.S. Appl. No. 16/027,109, Response filed Feb. 25, 2020 to Final Office Action dated Nov. 25, 2019", 17 pgs.
"U.S. Appl. No. 16/027,109, Response filed Sep. 18, 2020 to Non Final Office Action dated Mar. 27, 2020", 23 pgs.
"U.S. Appl. No. 16/027,109, Response filed Dec. 13, 2018 to Non Final Office Action dated Sep. 26, 2018", 20 pgs.
"U.S. Appl. No. 16/027,109, Response to Non Final Office Action dated Jul. 8, 2019 filed Sep. 13, 2019", 15 pgs.
"U.S. Appl. No. 17/135,597, Notice of Allowance dated Apr. 5, 2022", 13 pgs.
"International Application Serial No. PCT/US2018/040776, International Search Report dated Sep. 19, 2018", 3 pgs.
"International Application Serial No. PCT/US2018/040776, Written Opinion dated Sep. 19, 2018", 8 pgs.
Costa, et al., "Data Mining for Effective Risk Analysis in a Bank Intelligence Scenario", IEEE 23rd International Conference on Data Engineering Workshop, (2007), 904-911.
N, "U.S. Appl. No. 16/027,109, Notice of Allowance dated Nov. 23, 2020", 7 pgs.
"Application No. 18829042.3 Communication pursuant to Article 94 3 EPC dated May 25, 2023", (May 25, 2023), 10 pages.

* cited by examiner

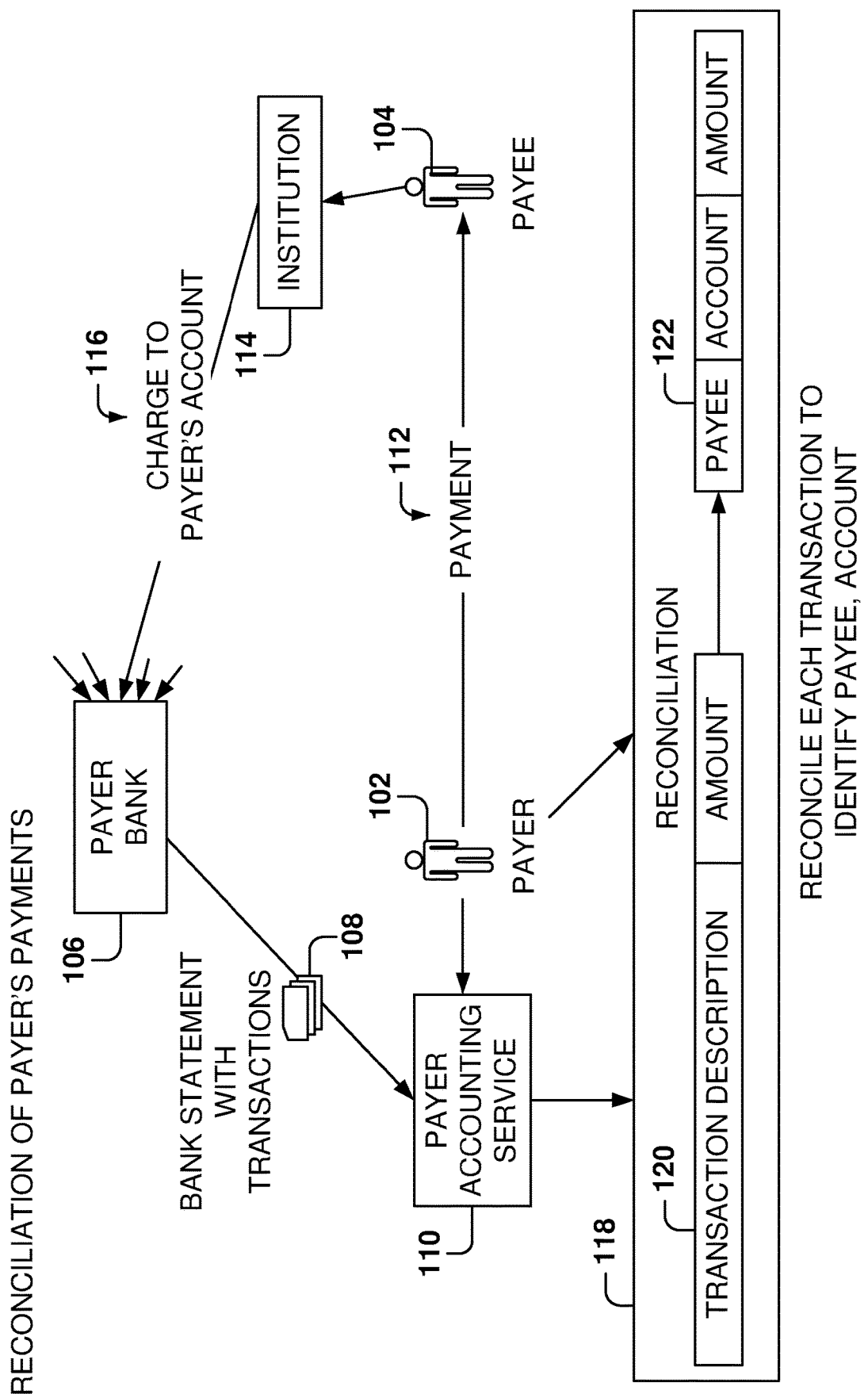

DATA RECONCILIATION BASED ON COMPUTER ANALYSIS OF DATA

CLAIM OF PRIORITY

This application is a Continuation application under 35 USC § 120 of U.S. patent application Ser. No. 17/135,597, entitled "Data Reconciliation Based on Computer Analysis of Data," filed on Dec. 28, 2020, which is a Continuation application under 35 USC § 120 of U.S. patent application Ser. No. 16/027,109, entitled "Data Reconciliation Based on Computer Analysis of Data," filed on Jul. 3, 2018, which claims priority to U.S. Provisional Patent Application No. 62/529,191, entitled "Data Reconciliation Based on Computer Analysis of Data," filed Jul. 6, 2017, all of which are incorporated herein by reference in their entirety.

TECHNICAL FIELD

The subject matter disclosed herein generally relates to methods, systems, and programs for reconciling two sources of data based on data descriptions.

BACKGROUND

Reconciliation is a procedure for confirming that the entries in an accounting system match the corresponding entries in a bank statement. When an accountant receives a bank statement, the accountant has to identify each entry in the bank statement to identify the corresponding account.

However, bank statements often include vague entries, which makes it difficult to identify the corresponding account and party. For example, an entry may not include the name of the payer, instead providing a general description of the nature of the entry, such as taxes, drawings, or wages. Sometimes, the name of party of the transaction may be inferred, such as for an entry "property taxes," by identifying the local entity where property taxes are paid.

Because of the great degree of variability in bank statement descriptions, bank reconciliation can be a difficult task, more so for a computer program trying to automatically reconcile the data. A person may use her experience to identify the nature of transactions, but automating a computer program to automatically identify the nature of a transaction, as well as the parties of the transaction, is a difficult task due to the lack of standards in providing descriptions for bank statements.

BRIEF DESCRIPTION OF THE DRAWINGS

Various ones of the appended drawings merely illustrate example embodiments of the present disclosure and cannot be considered as limiting its scope.

FIG. 1 is a diagram illustrating the reconciliation of a transaction, according to some example embodiments.

DETAILED DESCRIPTION

Figure 2A:
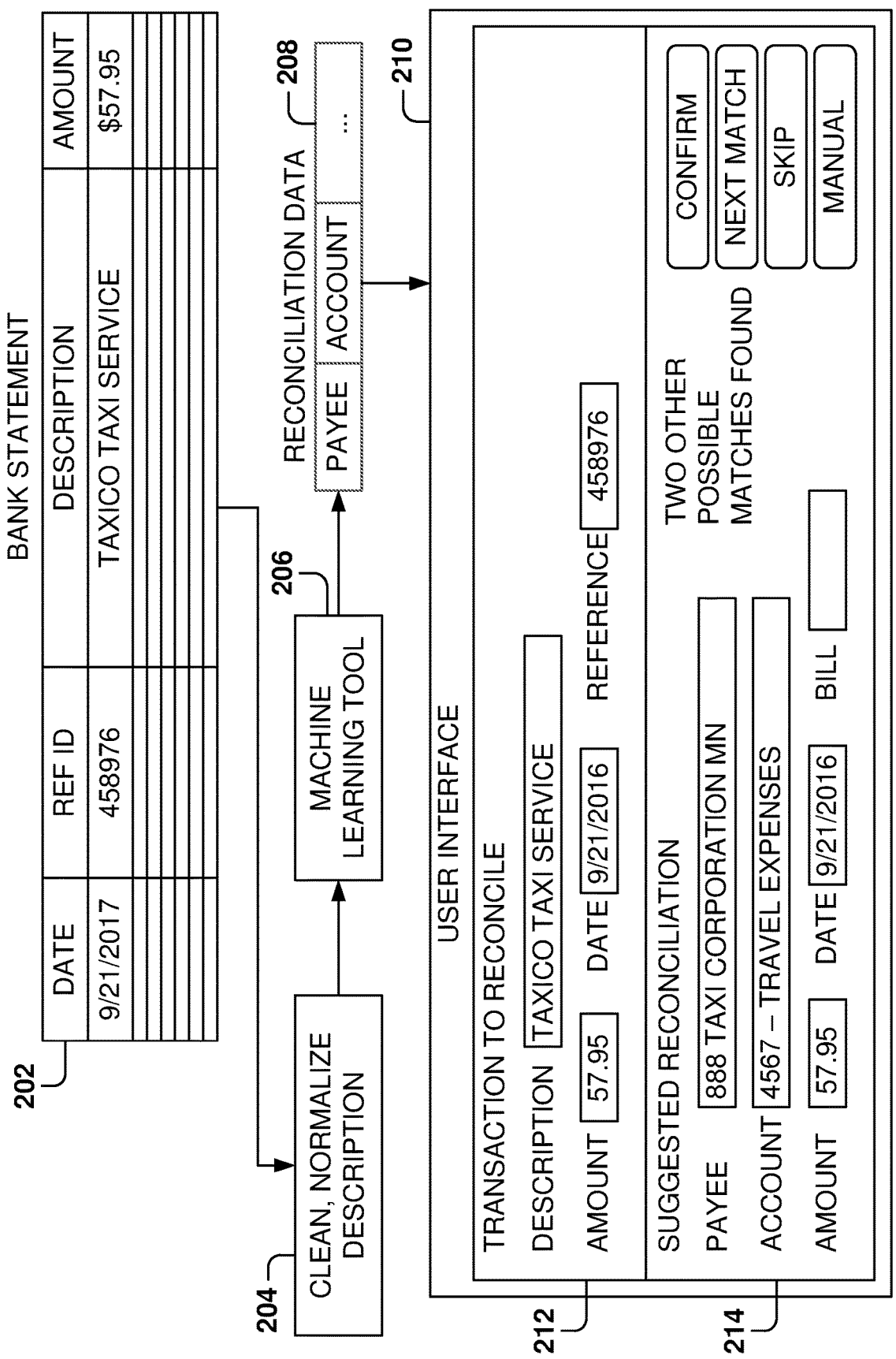
FIG. 2A illustrates the process for using a machine-learning program to reconcile a transaction extracted from a bank statement, according to some example embodiments.

Example methods, systems, and computer programs are directed to reconciling a transaction against data in a database to identify the transaction parameters based on text descriptors provided for the transaction. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

There are two aspects of bank reconciliation: payments and receivables that is, expenses and income. For example, when an expense is identified in a bank statement, the reconciliation process has to categorize that expense to be associated with a certain person or label, such as sales. Also, the reconciliation process identifies the other party in the transaction. Embodiments presented herein utilize the data provided in the bank statement entry and access to a machine-learning program (MLP) trained, with past reconciliation data, to automatically reconcile the statement entry or to provide good suggestions to the accountant for reconciling the entry.

Reconciliation features are identified for the MLP, such as information about transactions (e.g., description, amount, date), information about companies (e.g., location, industry, number of employees), and accounting data (e.g., payee information, account number, account name, tax rate, invoices, bills), or any combination thereof. The system utilizes transactions that have already been reconciled to train the MLP. Once trained, the MLP is able to receive an entry from the bank statement and provide suggestions on how to reconcile the entry, or to automatically reconcile the entry if the level of certainty estimated by the machine-learning program is above a predetermined threshold.

This simplifies the work of the reconciling accountant because the accountant simply has to choose from one or more suggestions for reconciliation, or because the system automatically reconciles some entries without requiring work from the accountant.

In addition, the data utilized for training the MLP may be data collected from a large number of customers across a geography. This means that a new company with little accounting history data is able to receive suggestions for reconciliation based on the experience collected from other clients by an accounting service. Further, the machine-learning program may also utilize a local model and learn about the parameters and behavior of the particular company in order to generate good suggestions based on the company's accounting history.

One general aspect includes a method including operations for identifying features for reconciling transactions of a first entity by a machine-learning program. The features include a description of the transaction, a name of a second entity associated with the transaction, and an account associated with the transaction. The method also includes an operation for training, by one or more processors, the machine-learning program with training data, which includes values of the features for previously reconciled transactions. The method also includes operations for receiving, by the one or more processors, a first transaction that includes a description, a date, and an amount, and for inputting, by the one or more processors, the first transaction to the machine-learning program. The machine-learning program generates one or more suggestions for reconciling the first transaction, each suggestion including the name of the second entity in the first transaction and an account associated with the first transaction.

One general aspect includes a system including a memory having instructions and one or more computer processors. The instructions, when executed by the one or more computer processors, cause the one or more computer processors to perform operations including: identifying features for reconciling transactions of a first entity by a machine-learning program, the features including a description of the transaction, a name of a second entity associated with the transaction, and an account associated with the transaction; training the machine-learning program with training data, the training data including values of the features for previously reconciled transactions; receiving a first transaction that includes a description, a date, and an amount; and inputting the first transaction to the machine-learning program, the machine-learning program generating one or more suggestions for reconciling the first transaction, each suggestion including the name of the second entity in the first transaction and an account associated with the first transaction.

One general aspect includes a non-transitory machine-readable storage medium including instructions that, when executed by a machine, cause the machine to perform operations including: identifying features for reconciling transactions of a first entity by a machine-learning program, the features including a description of the transaction, a name of a second entity associated with the transaction, and an account associated with the transaction; training the machine-learning program with training data, the training data including values of the features for previously reconciled transactions; receiving a first transaction that includes a description, a date, and an amount; and inputting the first transaction to the machine-learning program, the machine-learning program generating one or more suggestions for reconciling the first transaction, each suggestion including the name of the second entity in the first transaction and an account associated with the first transaction.

FIG. 1 is a diagram illustrating the reconciliation of a transaction, according to some example embodiments. In accounting, reconciliation is the process of ensuring that two sets of records (e.g., the balances of two accounts) are in agreement. For example, reconciliation is used to ensure that the money leaving an account matches the actual money spent. Further, with regard to a bank account, reconciliation is the procedure for confirming that the balance in a checkbook matches the corresponding bank statement. This includes matching the entries in a bank statement to payments or receipts of the account holder.

In the example illustrated in FIG. 1, a payer 102 sends a payment 112 (e.g., a check) to a payee 104. In some cases, the payment is associated with an invoice sent by the payee 104, and at other times the payment is not associated with an invoice (e.g., paying a taxi by credit card).

The payee remits the payment 112 to a financial institution 114 (e.g., bank or credit card company) to charge 116 the payer's account associated with the payer's bank 106, which receives charges from a plurality of sources. The bank then includes the payment as an entry in the bank statement 108 sent to the payer 102 or to the payer accounting service 110.

During reconciliation 118, for each transaction 120, the payer 102 has to identify the transaction description and amount to identify the accounting data 122, which includes the corresponding payee, the account in the accounting system, the amount in the accounting system, and other fields, such as tax rate, tax amount, and the like. Sometimes, there may already be a corresponding entry in the accounting system, but at other times a new entry has to be created.

Often, the challenge is to reconcile the entry based on a short or cryptic description in the bank statement, which may make reconciling a long, tedious, and boring task, where mistakes may take place. The goal of the accounting service is to make reconciliation an easy task (for example, by offering suggestions to the user based on the bank statement). For example, the amount may be a good indicator for generating suggestions by matching the amount to an entry in the accounting system. However, matching based on amount does not always work because there may not be an entry in the accounting system yet or because the payer may consolidate multiple payments into one single check.

While sometimes the name of the payee may be included in the statement, many times the name of the payee is not included, and instead there is a description of the service, such as "Taxi Service" or "Entertainment." These are some of the reasons why performing automatic reconciliation of bank statements in the accounting system may be difficult (sometimes impossible) and manual reconciliation is required.

Some solutions for reconciliation are based on defining rules for reconciliation, such as, "If the entry includes 'taxi' then account is 2547 and add new accounting entry." However, rules are difficult for reconciling a large amount of statements. Rules are also inconvenient because someone has to create and maintain the rules.

Embodiments presented herein are described with reference to reconciling a received payment, but the same principles may be utilized for reconciling payments made. The patterns for matching entries are different when paying or receiving payment, and the machine-learning algorithm described below takes into account whether the money is coming in or going out for reconciling each entry.

FIG. 2A illustrates the process for using a machine-learning program to reconcile a transaction extracted from a bank statement, according to some example embodiments. A bank statement 202 includes a plurality of entries, and each entry may include a date of the transaction, a reference identifier for the accounting system, a description, and an amount.

Embodiments presented herein make reconciliation easy by providing suggestions to the user or by automatically reconciling without user intervention when the system identifies the nature of the entry in the bank statement to a large degree of certainty.

In some example embodiments, a machine-learning tool 206 is used to analyze the bank statement entry, also referred to herein as bank entry or entry, to generate suggestions or automatically reconcile. In some example embodiments, the description from the entry is first cleaned and normalized (operation 204). For example, the description may be cleaned by eliminating punctuation marks (e.g., "/") and normalized to use a representative word for a family of words with the same meaning (e.g., reducing grammatical forms into a single form, such as transforming words "likes," "liked," "liking," and "like" to "like," a process referred to as stemming).

After the description is cleaned and normalized, the machine learning tool 206 receives the bank entry, and the cleaned and normalized description, to generate reconciliation data 208. The reconciliation data 208 includes one or more suggestions for reconciling the bank entry, where each suggestion includes at least the payee, the account, and the amount.

In some example embodiments, a user interface 210 is utilized to present the suggestions to the user. The user interface includes a transaction to be reconciled 212 (e.g., the entry in the bank statement) and a suggested reconciliation 214.

The transaction to be reconciled 212 includes a description (e.g., the description from the bank entry or a cleanup version), the amount, the date, and a reference identifier. The suggested reconciliation 214 includes fields for the payee, the account, the amount, the date, and a bill (optional). The suggested reconciliation 214 further includes buttons for selecting an action by the user and an informational message about the transaction (e.g., "two other possible matches found"). The buttons include a "confirm" button for accepting the suggestion, a "next match" button for requesting presentation of the next suggestion, a "skip" button for skipping this entry and proceeding to the next entry, and a "manual" option for entering data manually to reconcile the bank entry.

In some cases, the bank statement may reconcile several accounting entries (e.g., payment of several invoices with one check) and the multiple entries will be presented to the user indicating that the one payment correlates to several accounting entries.

Figure 2B:
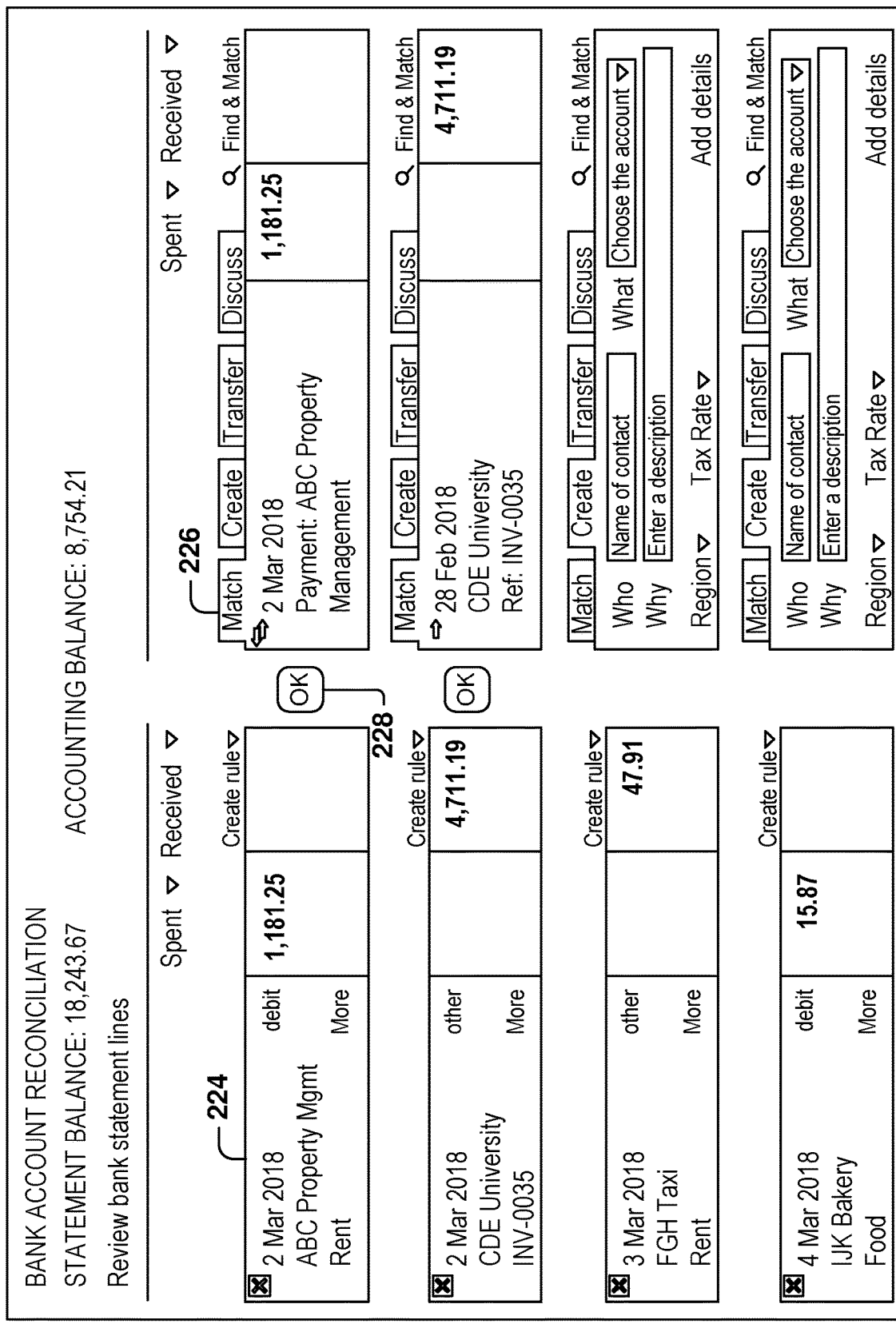
FIG. 2B is a user interface for reconciling transactions, according to some example embodiments.

FIG. 2B is a user interface 222 for reconciling transactions, according to some example embodiments. The user interface 222 presents a plurality of transactions to be reconciled 224 (e.g., entries in the bank statement) and suggested reconciliations 226 from the accounting system.

Each transaction to be reconciled 224 includes one or more of the date of the transaction (e.g., 2 Mar. 2018), the name of the party in the transaction (e.g., ABC Property Management), reference information (e.g., Rent), and the amount (e.g., 1,181.25), which may be an amount spent or an amount received. Additionally, the transaction to be reconciled 224 includes an option for deleting the transaction and an option for creating a rule to handle this type of transactions. It is to be noted that the system may also create rules over time based on past reconciliations made by users, where the rules for a certain type of entry may be reconciled to a certain account if the user performs the same reconciliation one or more times to match the entry in the bank statement to the account. Further, in addition to the option to add rules, the user has options to modify or delete rules, even those rules that are created automatically by the system.

The suggested reconciliations 226 include four tabs: match, create, transfer, and discuss. The match tab is presented when the accounting system has one or more suggested reconciliation entries. The match entry includes a date, a description (e.g., Payment: ABC Property), reference information (e.g., Management), the amount in the spent or the received sections, and a find option to search other entries in the accounting system for reconciliation.

A reconcile button 228 (e.g., including a message "OK" to indicate that the entries match) is provided as an option, and if the user selects the reconcile button 228, the transaction to be reconciled 224 will be reconciled with the suggested reconciliation 226.

If the user prefers to create a new accounting entry for reconciliation, the create tab may be selected. The create tab may also be automatically presented if the accounting system does not find a suggestion for reconciling an entry. The create tab includes options for entering the name or party of the transaction, the account, the description, the region, the tax rate, and adding additional details for the transaction. After the user enters the information, the reconcile button 228 is presented and the user may then reconcile the transaction with the created new entry.

The transfer tab can be selected to mark when the transaction is the result of transferring money between bank accounts of the user, where both bank accounts are linked to the accounting system. If one of the bank accounts are not in the accounting system, a create operation may be used instead of the transfer.

The discuss tab allows the user to leave a message for other users and discuss the reconciliation of the transaction. For example, the user may enter, "I don't know how to code this," and another user (e.g., an accountant) may see the message and enter the details for the transaction.

It is noted that the embodiments illustrated in FIGS. 2A and 2B are examples and do not describe every possible embodiment. Other embodiments may utilize different layouts for the user interface, different fields, additional fields, present more than one suggestion at a time, and so forth. The embodiments illustrated in FIGS. 2A and 2B should therefore not be interpreted to be exclusive or limiting, but rather illustrative.

Figure 3:
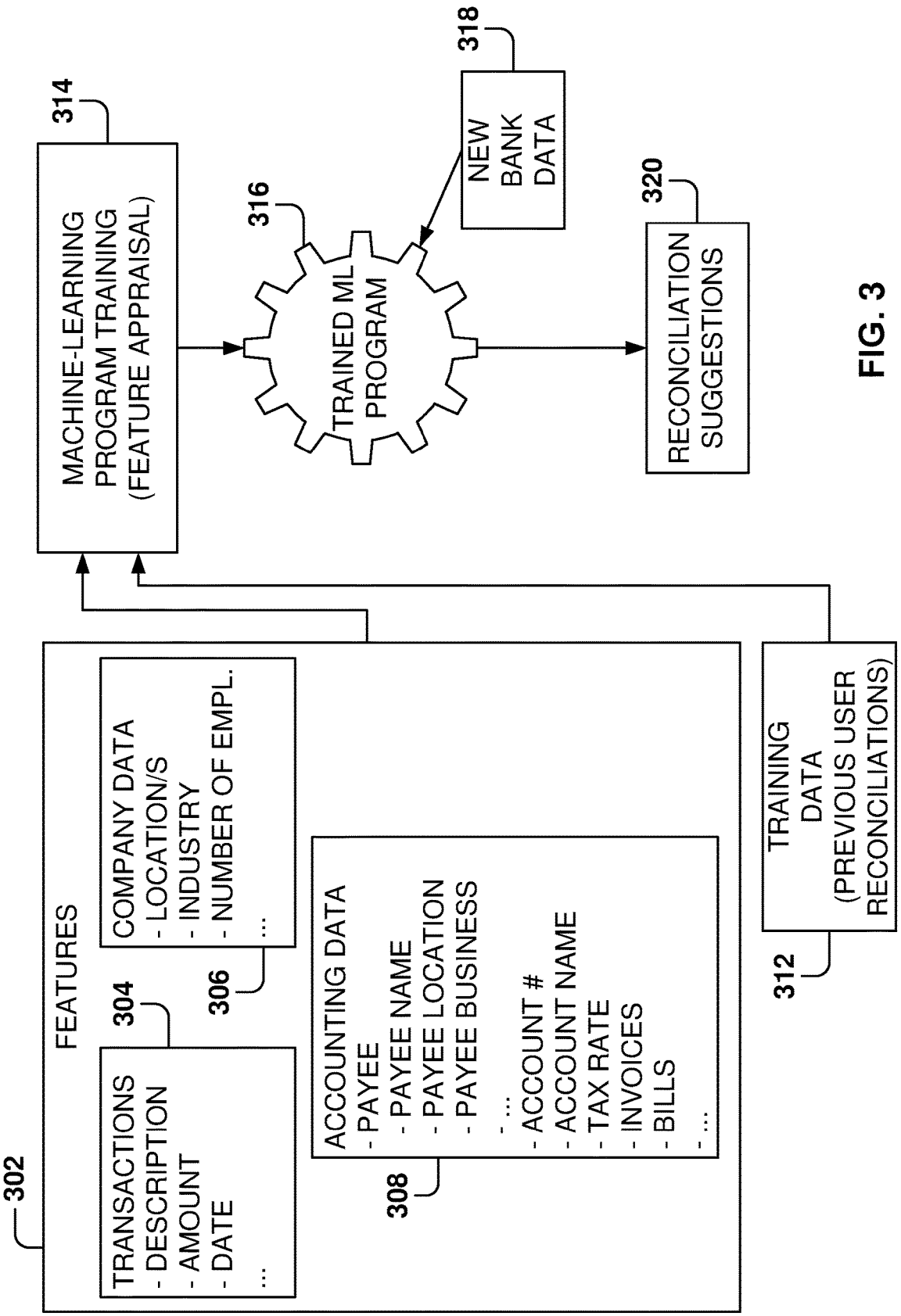
FIG. 3 illustrates the process for training and using the machine-learning program, according to some example embodiments.

FIG. 3 illustrates the process for training and using the machine-learning program, according to some example embodiments. In some example embodiments, machine-learning programs, also referred to as machine-learning algorithms or tools, are utilized to perform operations associated with reconciliation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 312 in order to make data-driven predictions or decisions expressed as outputs or assessments (e.g., reconciliation suggestions 320). Although example embodiments are presented with respect to a few machine-learning tools, the principles presented herein may be applied to other machine-learning tools.

In various example embodiments, different machine-learning tools are used. For example, Multinomial Naive Bayes (MNB), Support Vector Machines (SVM), multinomial Logistic Regression (LR), Random Forest (RF), neural networks (NN), matrix factorization, and other tools may be used for generating reconciliations.

For example, MNB is one of the simpler models to build and uses Bayes' theorem to combine observations of input features to produce posterior probabilities. Training time is proportional to the number of samples given and deciding between multiple classes usually requires choosing the label with the highest probability. SVM is a discriminative model that provides linear separability in higher dimensions, and SVM is a good model when the input features have high dimensionalities but can suffer from dimensionality if there are not sufficient samples. Additionally, the SVM model uses one-vs-one as the method of binarising multi-class classifications, which means that performance may degrade as the number of samples increases.

In general, there are two types of problems in machine learning: classification problems and regression problems. Classification problems aim at classifying items into one of several categories (for example, is this object an apple or an orange?). Regression algorithms aim at quantifying some items, for example, by providing a value that is a real number (e.g., what is the probability that this bank entry reconciles to a given payee). In some embodiments, example machine-learning algorithms provide a reconciliation score (e.g., a number from 1 to 100) for a reconciliation suggestion to match the bank entry. The machine-learning algorithms utilize the training data 312 to find correlations among identified features 302 that affect the outcome.

In one example embodiment, the features 302 may be of different types and may include one or more of transaction features 304, company data features 306, and accounting data features 308. Other embodiments may also utilize additional features.

The transaction features 304 includes data about bank transactions, such as description of the transaction, amount, and date. The company data features 306 includes information about the company of the user, such as company name, company locations, industry, number of employees, and the like. The accounting data features 308 includes information about the accounting system and includes information about payees (e.g., payee name, payee location or locations, payee business, payee address, payee contact name, etc.), account numbers, account names, tax rates, invoices, bills, and so forth.

In some example embodiments, the training data 312 includes previous user reconciliations, e.g., matches made manually, or suggestions accepted by users, to match a bank entry to an accounting entry (e.g., cash receipts, check payments, money transfers). In some example embodiments, the user reconciliations are entered by a plurality of clients of an accounting service, which means that the user accounts and names may be different for each client. However, in many cases, the accounting service utilizes standardized user accounts, or user account names, in order to be able to correlate the information from different companies. In some example embodiments, an account standardization is used to translate accounts from different users to a common standard.

In one example testing implementation, 700,000 entries were utilized for training data, although other embodiments may utilize a different number of entries, such as a million or more.

In some example embodiments, the training data is converted into a vocabulary set that can be used as an input to the model. The vocabulary size may include 100,000 unique tokens or more, and each token is associated with one word. In some example embodiments, for each word, a vector is created, and a sentence is represented by a matrix that combines the vectors of the words.

With the training data 312 and the identified features 302, the machine-learning tool is trained at operation 314. The machine-learning tool appraises the value of the features 302 as they correlate to the training data 312. The result of the training is the trained machine-learning program 316, also referred to as reconciliation MLP 316. In some example embodiments, a weight is assigned to each of the words and positive examples in the training data 312 increase the weight of the corresponding word for a possible outcome. Through the use of the training set, the weights are adjusted based on the inputs.

When the machine-learning program 316 is used to perform an assessment, new data 318 (e.g., a new bank statement or a new bank entry) is provided as an input to the trained machine-learning program 316, and the machine-learning program 316 generates one or more reconciliation suggestions 320 as output.

In some example embodiments, the training data 312 is divided by region, such as by country or county, and a different machine-learning program is utilized for generating reconciliations for each region. Usually, people spend most of their money with local businesses, so dividing the data by region is an easy way to reduce the complexity of the program in order to speed up the operation of the machine-learning program. This way, one machine-learning program is utilized to generate reconciliation suggestions 320 for the United States and another machine-learning program may be utilized for generating reconciliation suggestions 320 for Australia.

In another example embodiment, the country where the company is located is used as a feature and the machine-learning program is able to generate reconciliation suggestions that are based on identification of the country where the user is located, where the transaction takes place, and so forth.

In some example embodiments, the machine-learning program utilizes only a finite set of most common outputs (e.g., payees). In some example implementations, the top 100 most commonly used contexts are utilized and reconciliation suggestions are only provided for the top 100 most commonly used contexts. This way, the machine-learning program may be faster, although this means a trade-off by limiting the possible number of suggestions. In other example embodiments, the finite set is not imposed and all payees are considered for reconciliations.

In some example embodiments, a threshold of confidence is utilized, and reconciliation suggestions with a reconciliation score above the threshold of confidence will be considered for automatic reconciliation or for presenting to the user. Those suggestions below the threshold of confidence are discarded.

In other example embodiments, a threshold for automatic reconciliation is utilized, and those reconciliation suggestions with a reconciliation score above the threshold for automatic reconciliation will be automatically reconciled without requiring user validation. For example, the threshold for automatic reconciliation may be set at 0.95, and if a reconciliation score of 0.97 is received, the bank entry is automatically reconciled because of the high level of confidence provided by the machine-learning program. In other example embodiments, automatic reconciliation is not utilized and all suggestions have to be confirmed by the user. In some cases, the automatic reconciliation may be activated or deactivated by the user. For example, automatic reconciliation may be turned off for new users of the accounting service, and as more data is gathered in the reconciliation confidence improves, then the automatic reconciliation may be turned on.

In practice, a large number of accounting entries are concentrated on a relatively small set of payees, typically large organizations. Given that these large organizations appear often across bank statements, it is possible to build a system that recognizes and suggest these contacts. In particular, because of the shared data across multiple organizations, it is possible to immediately provide suggestions to new organizations in the accounting service as soon as they receive a bank statement.

Figure 4:
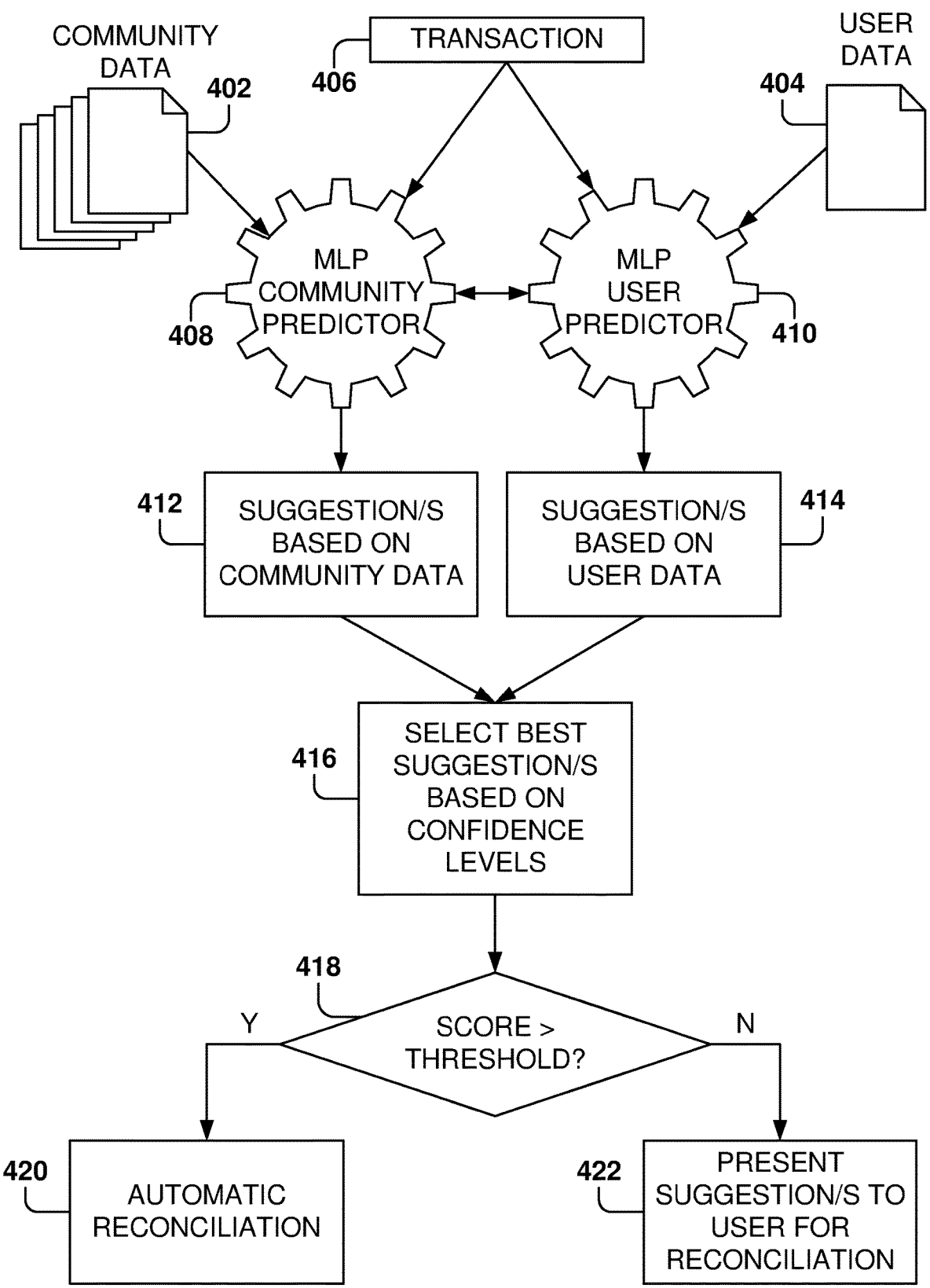
FIG. 4 illustrates the use of two machine-learning programs for reconciling a transaction, according to some example embodiments.

FIG. 4 illustrates the use of two machine-learning programs for reconciling a transaction, according to some example embodiments. In some example embodiments, multiple MLPs may be used for reconciliation, where each MLP is geared for a specific reconciliation feature. For example, two machine-learning programs are utilized for suggesting reconciliations: an MLP community predictor 408 that utilizes community data 402 and an MLP user predictor 410 that uses user data 404.

The MLP community predictor 408 works across many organizations and is better for predicting reconciliations based on companies that have a large number of transactions. This allows the system to provide recommendations for new clients, even when the new clients do not have any transaction history. Some businesses are present around the world (e.g., Uber, Amazon, and Ford) and some of these businesses are very often relevant to most local areas.

In some example embodiments, other models for utilizing different MLPs are possible, such as by having an MLP focused on businesses within a local area and other MLPs focused on national or worldwide models. The embodiments illustrated in FIG. 4 are presented with reference to a community predictor and a user predictor, but the same principles may be applied for other MLP predictors based on geography. In our example embodiments, the MLP community predictor and MLP user predictor can also be combined with geographically oriented MLPs.

The MLP user predictor 410 is customized for the data associated with each user and as more reconciliation data becomes available for the user, it is possible to get more accurate reconciliations since a large percentage of transactions within an organization are repeat transactions for the same payees.

The personalization predictor is useful in large countries, (e.g., the United States) because the MLP user predictor is able to narrow the large list of possible payees in the large country to focus on the area where a certain company does a large amount of transactions. In some example embodiments, a national model is used in conjunction with a regional model to be able to capture national transactions as well as local transactions. In other example embodiments, the predictors may be broken down by state or county.

Further, the data learned from using the MLP user predictor 410 may be fed into the MLP community predictor. For example, the MLP user predictor 410 may identify Uber as a payee, and as Uber is identified as a payee for other users, the MLP community predictor may consolidate this data to a common description for Uber. Further, the MLP community predictor may identify that Uber expenses are often associated with a certain account, such as "491—Travel—National," and use this information for making community predictions.

When a transaction 406 is identified for reconciliation, the transaction 406 is input to the MLP community predictor 408 and the MLP user predictor 410. At operation 412, the MLP community predictor 408 generates reconciliation suggestions based on the community data 402, and at operation 414, the MLP user predictor 410 generates reconciliation suggestions based on the user data 404.

At operation 416, the best suggestions from the MLP community predictor and the MLP user predictor are selected based on the confidence levels (e.g., the reconciliation score provided by the respective MLPs).

At operation 418, a check is made to determine if the reconciliation score, for each of the suggestions, is above a predetermined automatic reconciliation threshold. If the reconciliation score is above the automatic reconciliation threshold, the method flows to operation 420 or otherwise to operation 422.

At operation 420, the automatic reconciliation takes place, which means that the suggestion for reconciliation is automatically made by the system, without requiring user interaction. On the other hand, at operation 422, the one or more suggestions are presented to the user for reconciliation.

It is noted that the embodiments illustrated in FIG. 4 are examples and do not describe every possible embodiment. Other embodiments may utilize different MLPs, additional MLPs, additional data for the MLPs, and so forth. The embodiments illustrated in FIG. 4 should therefore not be interpreted to be exclusive or limiting, but rather illustrative.

Figure 5:
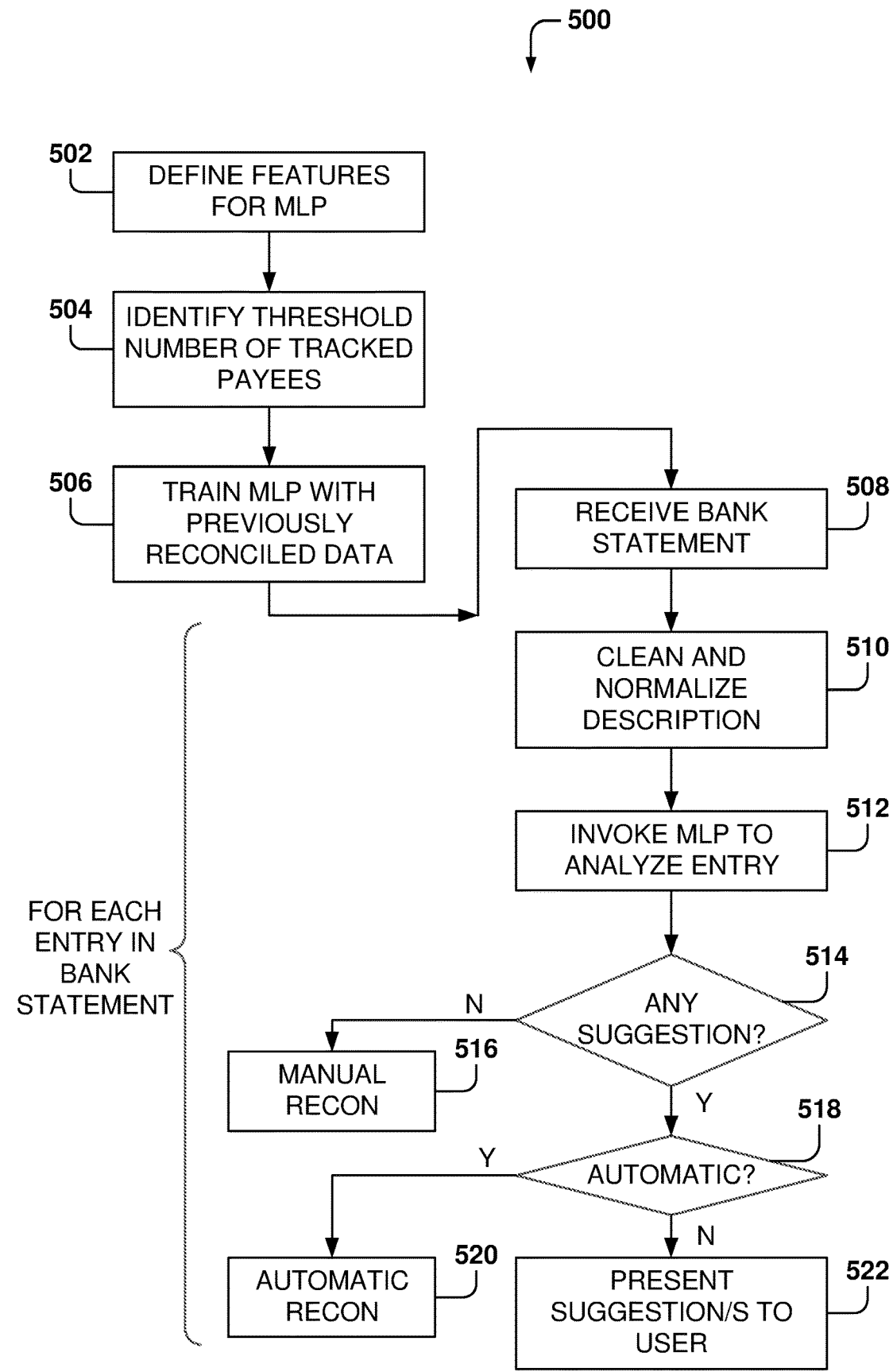
FIG. 5 is a flowchart of a method for reconciling transactions, according to some example embodiments.

FIG. 5 is a flowchart of a method 500 for reconciling transactions, according to some example embodiments. While the various operations in this flowchart are presented and described sequentially, one of ordinary skill will appreciate that some or all of the operations may be executed in a different order, be combined or omitted, or be executed in parallel.

At operation 502, the features utilized by the MLP are defined. From operation 502, the method 500 flows to operation 504 for identifying a threshold number of tracked payees. For example, the system may select to generate reconciliations for the top 500 most commonly used payees, but other thresholds may be defined, such as 1000 most common payees or 10,000 most common payees. In other example embodiments, the threshold is omitted and all the payees are considered when making reconciliation suggestions.

From operation 504, the method flows to operation 506 where the MLP is trained with previously reconciled data. From operation 506, the method goes to operation 508 where a bank statement is received, the bank statement including entries for reconciliation by the accounting system.

For each entry in the bank statement, a plurality of operations 510-522 are performed. At operation 510, the entry is cleaned and normalized, which means cleaning and normalizing the description provided by the bank statement. From operation 510, the method flows to operation 512 where the MLP is invoked to analyze the respective entry. At operation 514, a check is made to determine if the MLP has provided any suggestions for reconciliation. If suggestions are provided, the method flows to operation 518 and if no suggestions are provided, then the method flows to operation 516.

At operation 516, manual reconciliation is performed by the user to manually enter the accounting information to reconcile the entry. At operation 518, a check is made to determine if automatic reconciliation is to be performed by checking that the reconciliation score for the best suggestion is above the predetermined automatic reconciliation threshold. If automatic reconciliation is available, the method flows to operation 520, and if automatic reconciliation is not available the method flows to operation 522.

At operation 520, automatic reconciliation is performed by reconciling the bank entry with the reconciliation suggestion and making the entry in the accounting system, without requiring user input or validation. At operation 522, the one or more suggestions provided by the MLP are presented to the user for user validation.

In some example embodiments, the reconciliation system is tested by utilizing some of the known reconciliations as input for the MLP to compare how the MLP suggestions match the actual reconciliation data. For example, 70% of the reconciliation data may be used for training the MLP and 30% of the data used for testing.

Without wishing to be bound by theory, in some example tests, the system showed that suggestions are about 90% accurate for the most common payees. Further, the system shows that there are trade-offs between speed, accuracy, and confidence. Depending on the amount of data used, the MLP is faster or slower in generating suggestions. Further, by adjusting the confidence level, it is possible to filter out suggestions with low probability of success. However, it is noted that even better results are expected for common payees and other payees, because the system leverages experience learned and as additional computing resources are utilized.

Figure 6:
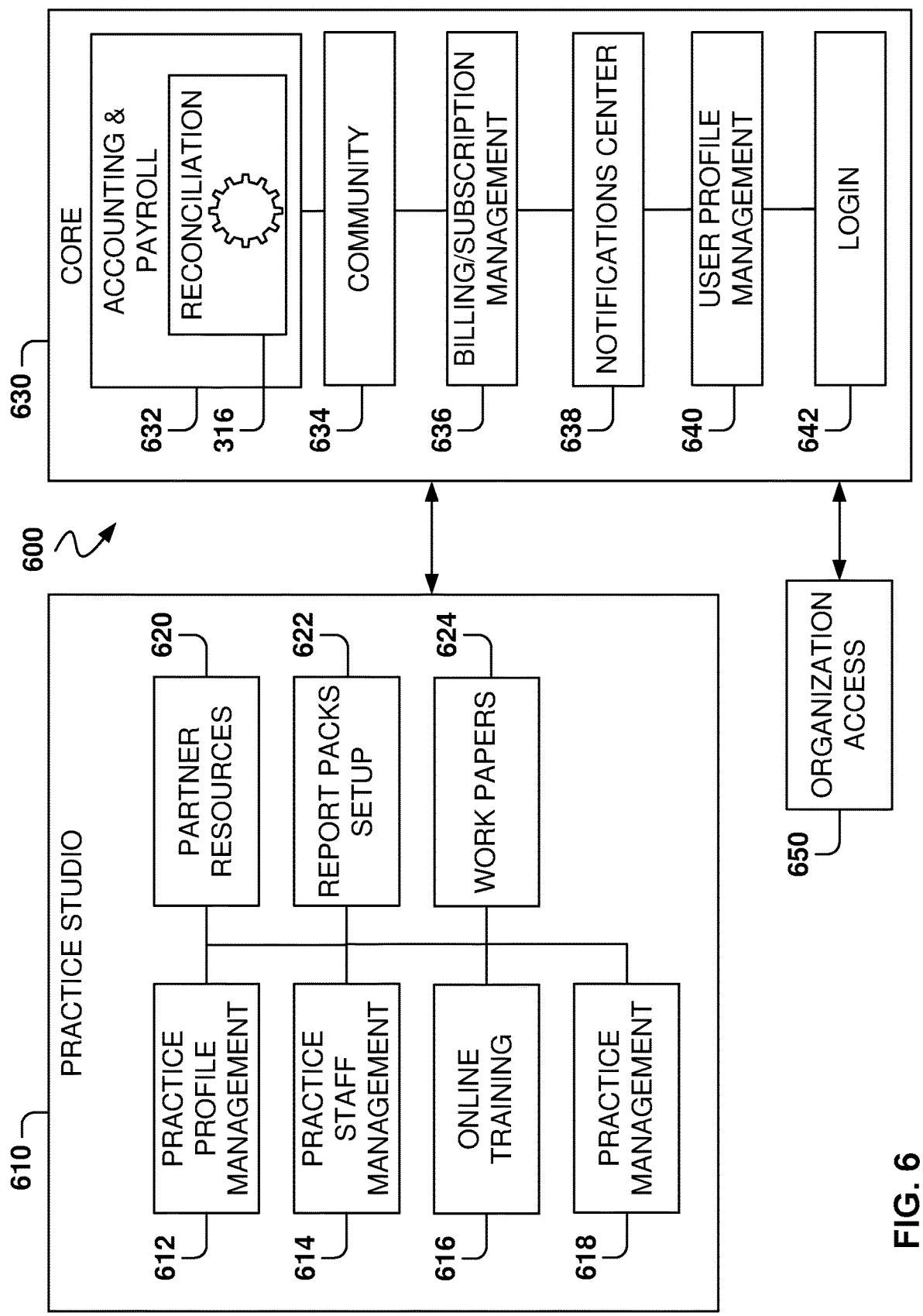
FIG. 6 is a block diagram depicting an example reconciliation platform, according to some embodiments.

FIG. 6 is a block diagram depicting an example reconciliation platform 600, according to some embodiments. The example reconciliation platform 600 may provide accounting tools to a particular entity managing accounting for one or more businesses. The example reconciliation platform 600 may include a practice studio 610 that allows an entity to manage one or more businesses and an organization access component 650 that provides a business with tools for managing accounting data for that particular business. The practice studio 610 may include a practice profile management component 612, a practice staff management component 614, an online training component 616, a practice management component 618, a partner resources component 620, a report packs setup component 622, and a work papers component 624. The practice studio 610 may be in communication with core features 630. The core features 630 may include an accounting and payroll component 632 (including reconciliation MLP 316), a community component 634, a billing/subscription management component 636, a notifications center component 638, a user profile management component 640, and a login component 642. The organization access component 650 may be in communication with the core features 630. The practice studio 610 and core features may be accessed by an entity using login component 642.

The features of the practice studio 610 provide a suite of tools for accountants to interact with their clients and manage their practices. The core features 630 provide the core functionality and user tools common to both accountants and businesses. The organization access component 650 provides a user interface for individual businesses to access their data.

Practice studio 610 is the central login for accountants. For example, an accountant with multiple clients, each of which is a small business, can log in using practice studio 610 and gain access to the accounting data for the clients, messages from the clients, and so on.

The practice profile management component 612 allows an accounting practice to manage and view its profile settings. For example, an accounting practice may have a partner level, representing the strength of its relationship with the provider for the action history platform. The partner level may be based on the number of clients associated with the accounting practice in the action history platform. Other profile settings may include the name, address, telephone number, email address, and so forth of the accounting practice.

The practice staff management component 614 provides the ability for the manager of an accounting practice to control settings for the staff of the practice. For example, some staff members may have read-only access to data for certain clients, some staff members may have read-write access for certain clients, some staff members may be able to modify the access permissions for other staff members, and so on.

The online training component 616 provides training for accountants and their staff. In some cases, the provided training includes one or more video presentations and one or more online tests. The practice management component 618 provides services for accountants. The services provided by the practice management component 618 may include workflow tools, customer relationship management (CRM) tools, lead generation tools, job management tools, invoice generation tools, and so forth.

The partner resources component 620 provides information regarding third-party partners. For example, a third party may provide tools that interact with the system to provide useful functionality beyond that of the system alone. The user can access the partner resources component 620 to learn about available third-party tools.

The report packs setup component 622 provides tools to allow accountants to create and generate standardized sets of reports. The work papers component 624 provides tools for accountants to interactively create financial reports. For example, an accountant can enter known data for a client into the work paper and then send the work paper to the client with an indication of data needed from the client. After the client enters the missing data into the work paper, the accountant can complete the report.

The core features 630 includes components that are used both by accountants and organizations. The accounting and payroll component 632 provides the general ledger for organizations. The general ledger may be integrated with the organization's payroll, bypassing the separate step of entering payroll data into the general ledger each pay period. The accounting and payroll component 632 accesses banking data for each client business. The banking data may be imported either through a bank feed or a user- or accountant-created document. The accounting and payroll component 632 may also communicate with third-party tools via an application protocol interface (API).

The reconciliation MLP 316 enables generation of reconciliation suggestions with the respective reconciliation score. The reconciliation MLP 316 may interact with the accounting and payroll component 632, the billing/subscription management component 636, and the notifications center 638, for example, to perform data processing operations on data corresponding to inflow and outflow financial transactions.

The community component 634 provides a forum through which users can communicate. The billing/subscription management component 636 allows a user to configure one or more billing accounts for each organization using the system. The notifications center component 638 provides notifications to users. For example, users may send messages to each other, which appear as notifications. Notifications may also be created by the system (e.g., by accounting and payroll component 632) based on events. The user profile management component 640 allows a user to manage the profile of the user's organization and the profiles of others based on permission settings. For example, an accountant may have permission to manage the profiles of the accountant's clients. The profile may include public-facing information such as a business name and address. The login component 642 verifies the identity of a user logging into the system (e.g., via user name and password).

The organization access component 650 accesses the core features 630 for a single organization. The organization access component 650 presents, after user verification by the login component 642, a user interface with options for a single organization without the additional features used only by the practice studio 610.

Figure 7:
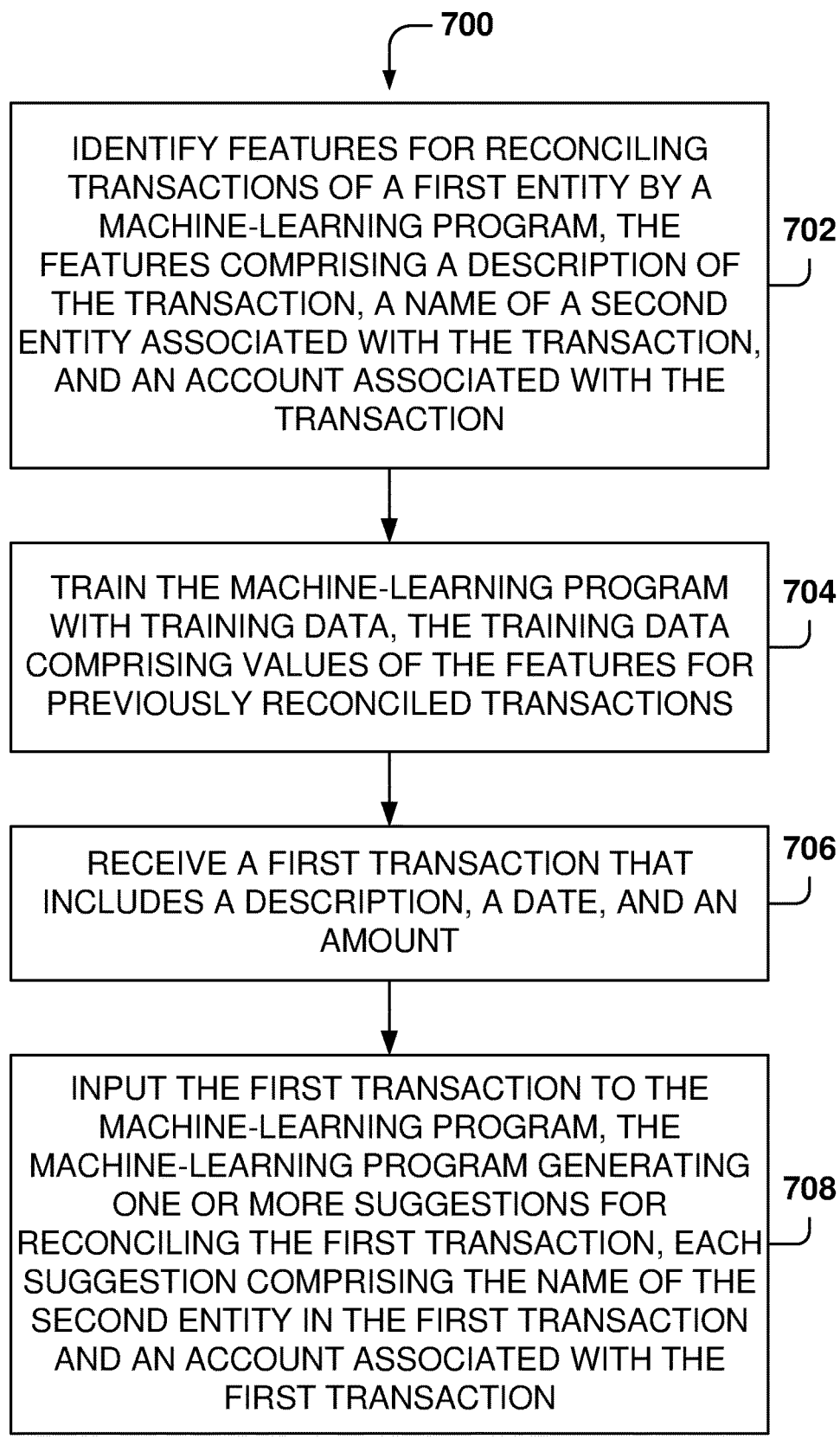
FIG. 7 is a flowchart of a method for reconciling a transaction against data in a database to identify the transaction parameters based on text descriptors provided for the transaction, according to some example embodiments.

FIG. 7 is a flowchart of a method 700 for reconciling a transaction against data in a database to identify the transaction parameters based on text descriptors provided for the transaction, according to some example embodiments.

Operation 702 is for identifying features for reconciling transactions of a first entity by a machine-learning program. The features comprise a description of the transaction, a name of a second entity associated with the transaction, and an account associated with the transaction.

From operation 702, the method flows to operation 704, where one or more processors are used to train the machine-learning program with training data, the training data comprising values of the features for previously reconciled transactions.

Further, from operation 704 the method flows to operation 706, where the one or more processors receive a first transaction that includes a description, a date, and an amount. At operation 708, the one or more processors input the first transaction to the machine-learning program. The machine-learning program generates one or more suggestions for reconciling the first transaction, each suggestion comprising the name of the second entity in the first transaction and an account associated with the first transaction.

Implementations may include one or more of the following features. In one example, the features for reconciling transactions further include a location of the first entity, an industry of the first entity, and location of the second entity.

In one example, the features for reconciling transactions further include a tax rate of the transaction, an account identifier, an account name associated with the account identifier, an invoice identifier, and a bill identifier.

In one example, receiving the first transaction further includes receiving a statement with one or more transactions and extracting the one or more transactions, where each extracted transaction is reconciled utilizing the machine-learning program.

In another example, the machine-learning program identifies a score for each of the one or more suggestions, where the method 700 further includes: for the suggestion with a highest score, checking if the score is above a first predetermined threshold, and automatically reconciling the first transaction with the suggestion with the highest score when the highest score is above the first predetermined threshold.

In one example, the method 700 further includes: when the highest score is not above the first predetermined threshold, checking if the highest score is above a second predetermined threshold; presenting a user interface for manually reconciling the first transaction with any of the one or more suggestions when the highest score is above the second predetermined threshold; and, when the highest score is below or equal to the second predetermined threshold, requesting manual reconciliation for the first transaction in the user interface without presenting any suggestions.

In one example, the user interface includes a first region with information about the first transaction and a second region for the suggestion, the second region including a name of the second entity, an account, a bill identifier, a confirmation selector, and a manual selector for requesting manual reconciliation.

In one example, the training data is segmented for a plurality of geographical regions, where the machine-learning program reconciles transactions for one of the geographical regions.

In one example, the training data includes data obtained from a plurality of entities, where entities without a history of reconciled transactions are provided with suggestions for reconciling transactions.

In one example, the method 700 further includes: training a custom machine-learning program with transactions previously reconciled by the first entity, the custom machine-learning program providing suggestions for the first entity based on the transactions previously reconciled by the first entity; generating one or more custom suggestions for the first transaction by the custom machine-learning program; and selecting a best suggestion for presentation to a user based on the suggestions and the custom suggestions.

Figure 8:
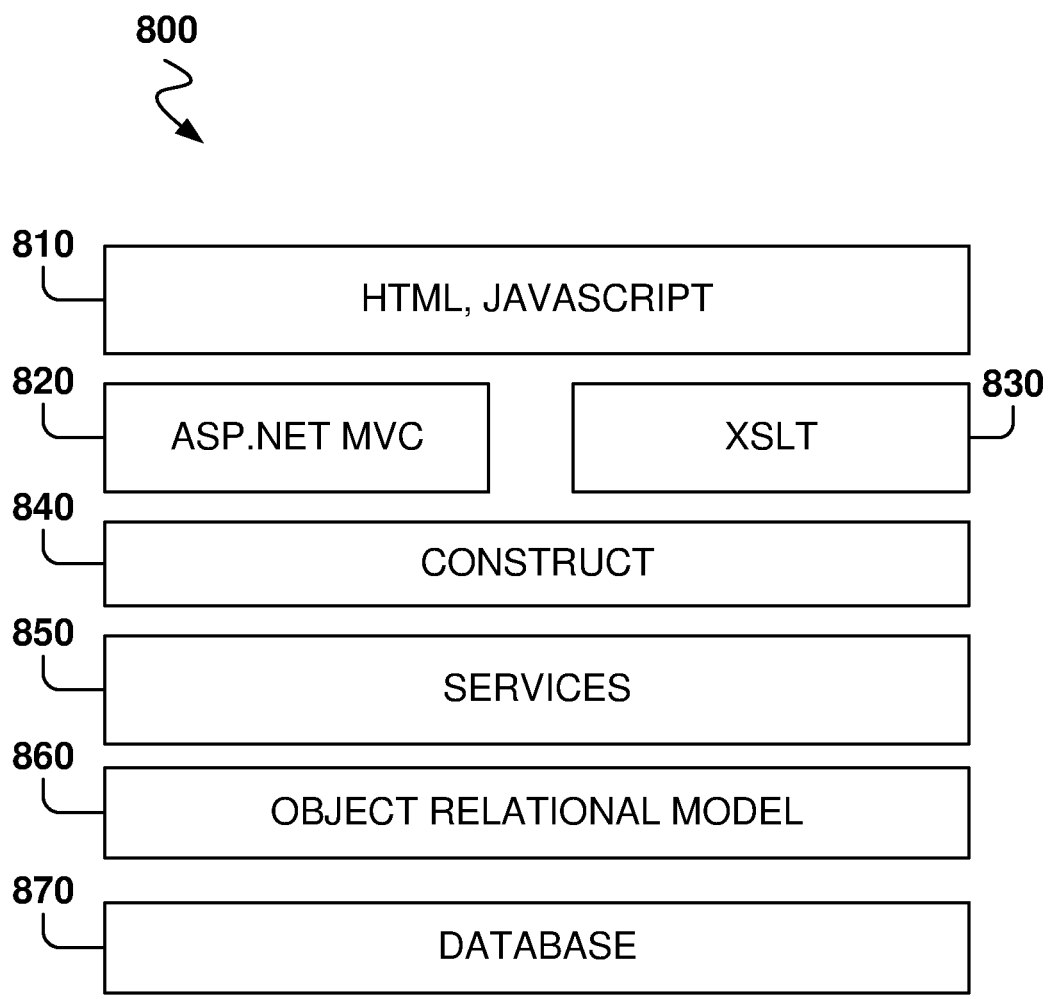
FIG. 8 is a block diagram depicting an example application framework, according to some embodiments.

FIG. 8 is a block diagram depicting an example application framework 800, according to some embodiments. The history application framework 800 may be an end-to-end web development framework enabling a "software as a service" (SaaS) product. The history application framework 800 may include a hypertext markup language (HTML) and/or JavaScript layer 810, ASP.NET Model-View-Controller (MVC) 820, extensible stylesheet language transformations (XSLT) 830, construct 840, services 850, object relational model 860, and database 870.

The HTML and/or JavaScript layer 810 provides client-side functionality, such as user interface (UI) generation, receipt of user input, and communication with a server. The client-side code may be created dynamically by the ASP.NET MVC 820 or the XSLT 830. Alternatively, the client-side code may be statically created or dynamically created using another server-side tool.

The ASP.NET MVC 820 and XSLT 830 provide server-side functionality, such as data processing, web page generation, and communication with a client. Other server-side technologies may also be used to interact with the database 870 and create an experience for the user.

The construct 840 provides a conduit through which data is processed and presented to a user. For example, the ASP.NET MVC 820 and XSLT 830 can access the construct 840 to determine the desired format of the data. Based on the construct 840, client-side code for presentation of the data is generated. The generated client-side code and data for presentation is sent to the client, which then presents the data.

In some example embodiments, when the MLP is invoked to analyze an entry (operation 512 in FIG. 5), the MVC website makes an HTTP API call to a Python-based server. Also, the MVC website makes another HTTP API call to the Python-based server to present the suggestions to the user (operation 522 in FIG. 5).

The services 850 provide reusable tools that can be used by the ASP.NET 820, the XSLT 830, and the construct 840 to access data stored in the database 870. For example, aggregate data generated by calculations operating on raw data stored in the database 870 may be made accessible by the services 850.

The object relational model 860 provides data structures usable by software to manipulate data stored in the database 870. For example, the database 870 may represent a many-to-one relationship by storing multiple rows in a table, with each row having a value in common. By contrast, the software may prefer to access that data as an array, where the array is a member of an object corresponding to the common value. Accordingly, the object relational model 860 may convert the multiple rows to an array when the software accesses them and perform the reverse conversion when the data is stored.

Figure 9:
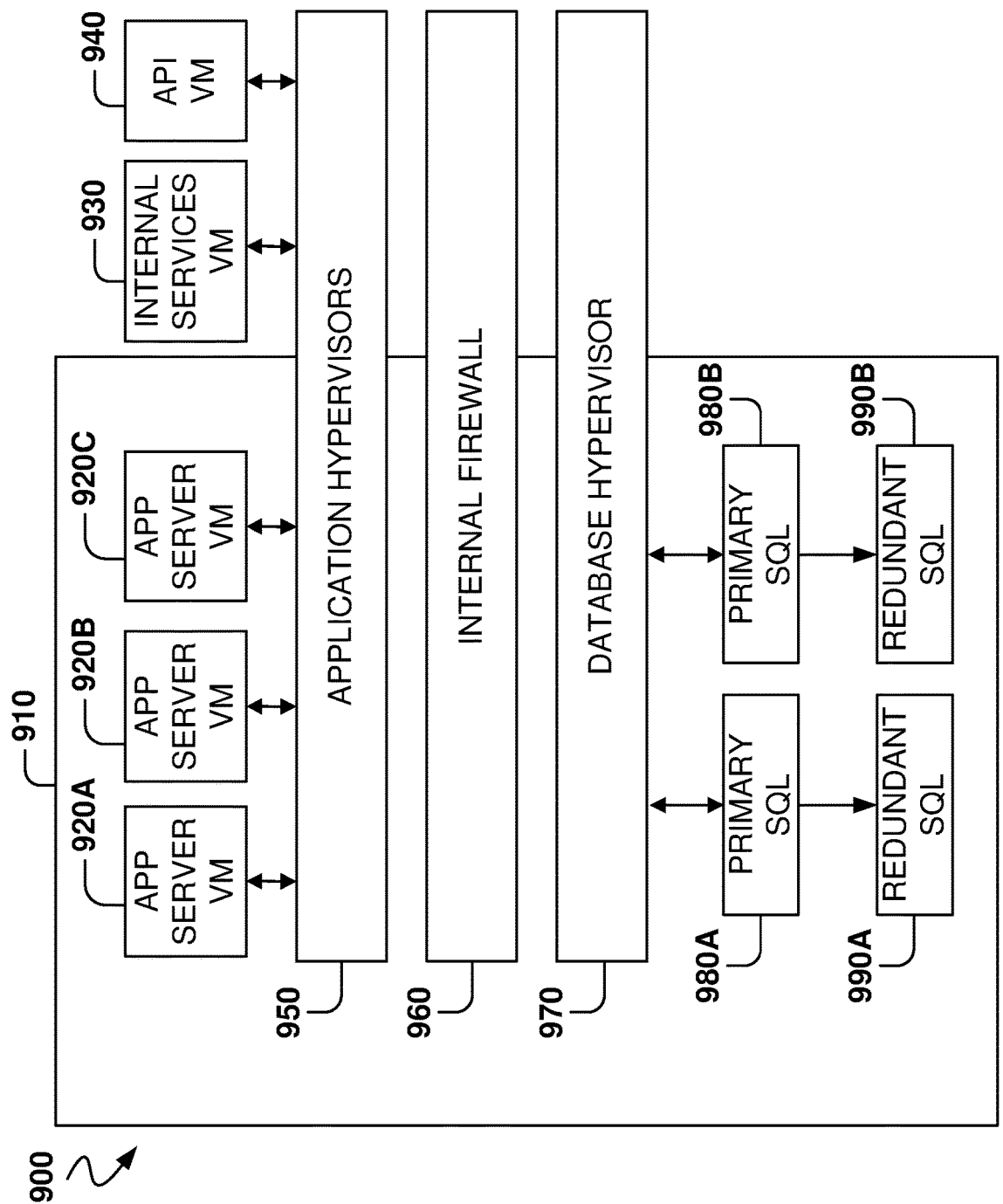
FIG. 9 is a block diagram depicting an example hosting infrastructure, according to some embodiments.

FIG. 9 is a block diagram depicting an example hosting infrastructure 900, according to some embodiments. The platform may be implemented using one or more pods 910. Each pod 910 includes application server virtual machines (VMs) 920 (shown as application server virtual machines 920A-920C in FIG. 9) that are specific to the pod 910 as well as application server virtual machines that are shared between pods 910 (e.g., internal services VM 930 and application protocol interface VM 940). The application server virtual machines 920-940 communicate with clients and third-party applications via a web interface or an API. The application server virtual machines 920-940 are monitored by application hypervisors 950. In some example embodiments, the application server virtual machines 920A-920C and the API VM 940 are publicly accessible while the internal services VM 930 is not accessible by machines outside of the hosting infrastructure 900. The app server VMs 920A-920C may provide end-user services via an application or web interface. The internal services VM 930 may provide back-end tools to the app server VMs 920A-920C, monitoring tools to the application hypervisors 950, or other internal services. The API VM 940 may provide a programmatic interface to third parties. Using the programmatic interface, the third parties can build additional tools that rely on the features provided by the pod 910.

An internal firewall 960 ensures that only approved communications are allowed between the database hypervisor 970 and the publicly accessible virtual machines 920-940. The database hypervisor 970 monitors the primary SQL servers 980A and 980B and the redundant SQL servers 990A and 990B. The virtual machines 920-940 can be implemented using Windows 8008 R2, Windows 8012, or another operating system. The support servers can be shared across multiple pods 910. The application hypervisors 950, internal firewall 960, and database hypervisor 970 may span multiple pods 910 within a data center.

Figure 10:
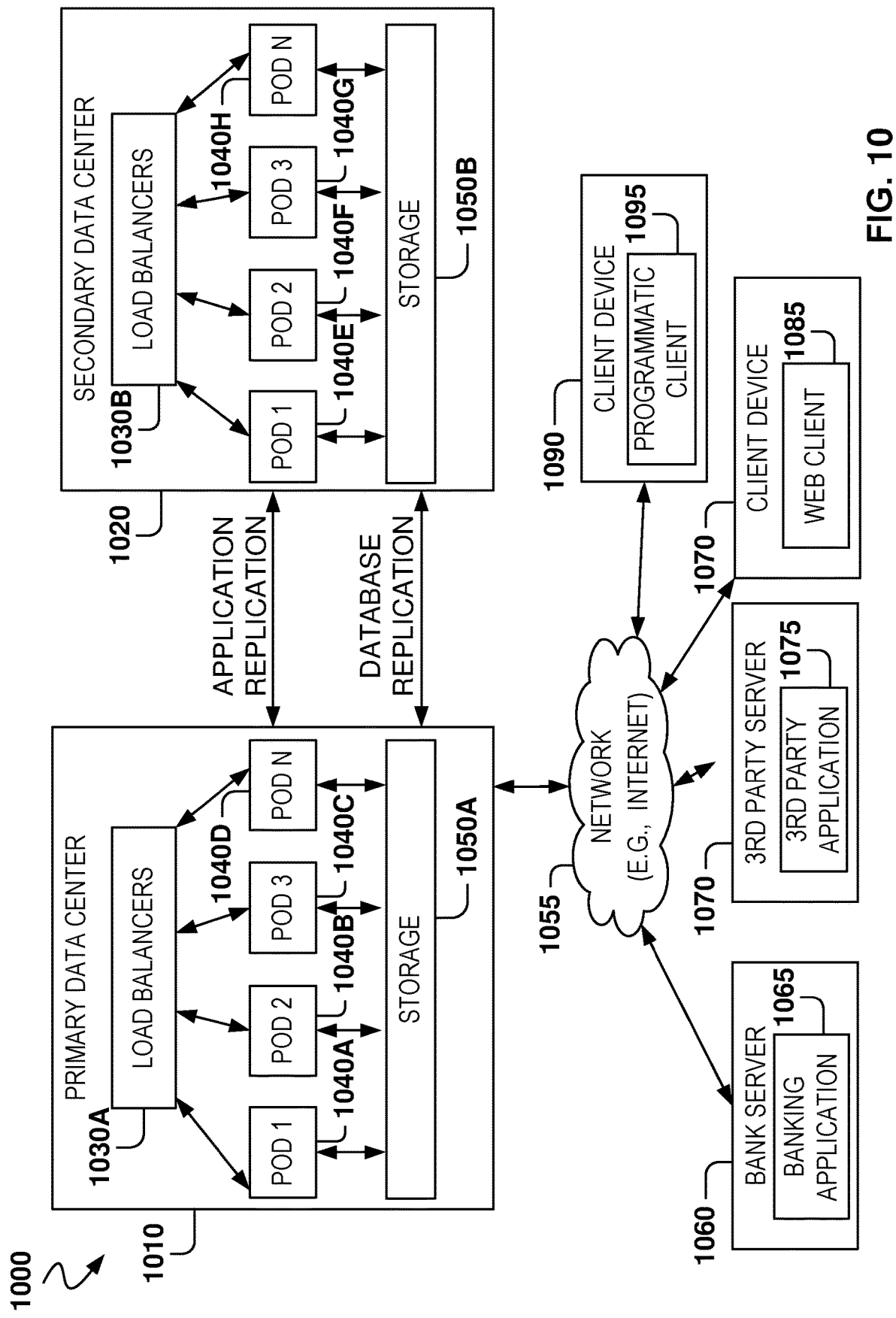
FIG. 10 is a block diagram depicting an example data center system for implementing embodiments.

FIG. 10 is a block diagram depicting an example data center system 1000 for implementing embodiments. The primary data center 1010 services customer requests and is replicated to the secondary data center 1020. The secondary data center 1020 may be brought online to serve customer requests in case of a fault in the primary data center 1010. The primary data center 1010 communicates over a network 1055 with bank server 1060, third party server 1070, client device 1070, and client device 1090. The bank server 1060 provides banking data (e.g., via a banking application 1065). The third-party server 1070 is running third party application 1075. Client devices 1080 and 1090 interact with the primary data center 1010 using web client 1085 and programmatic client 1095, respectively.

Within each data center 1010 and 1020, a plurality of pods, such as the pod 910 of FIG. 9, are shown. The primary data center 1010 is shown containing pods 1040a-1040d. The secondary data center 1020 is shown containing pods 1040e-1040h. The applications running on the pods of the primary data center 1010 are replicated to the pods of the secondary data center 1020. For example, EMC replication (provided by EMC Corporation) in combination with VMWare site recovery manager (SRM) may be used for the application layer replication. The database layer handles replication between a storage layer 1050a of the primary data center and a storage layer 1050b of the secondary data center. Database replication provides database consistency and the ability to ensure that all databases are at the same point in time.

The data centers 1010 and 1020 use load balancers 1030a and 1030b, respectively, to balance the load on the pods within each data center. The bank server 1060 interacts with the primary data center 1010 to provide bank records for bank accounts of the client. For example, the client may provide account credentials to the primary data center 1010, which the primary data center 1010 uses to gain access to the account information of the client. The bank server 1060 can provide the banking records to the primary data center 1010 for later reconciliation by the client using the client device 1080 or 1090.

The third-party server 1070 may interact with the primary data center 1010 and the client device 1080 or 1090 to provide additional features to a user of the client device 1080 or 1090.

Figure 11:
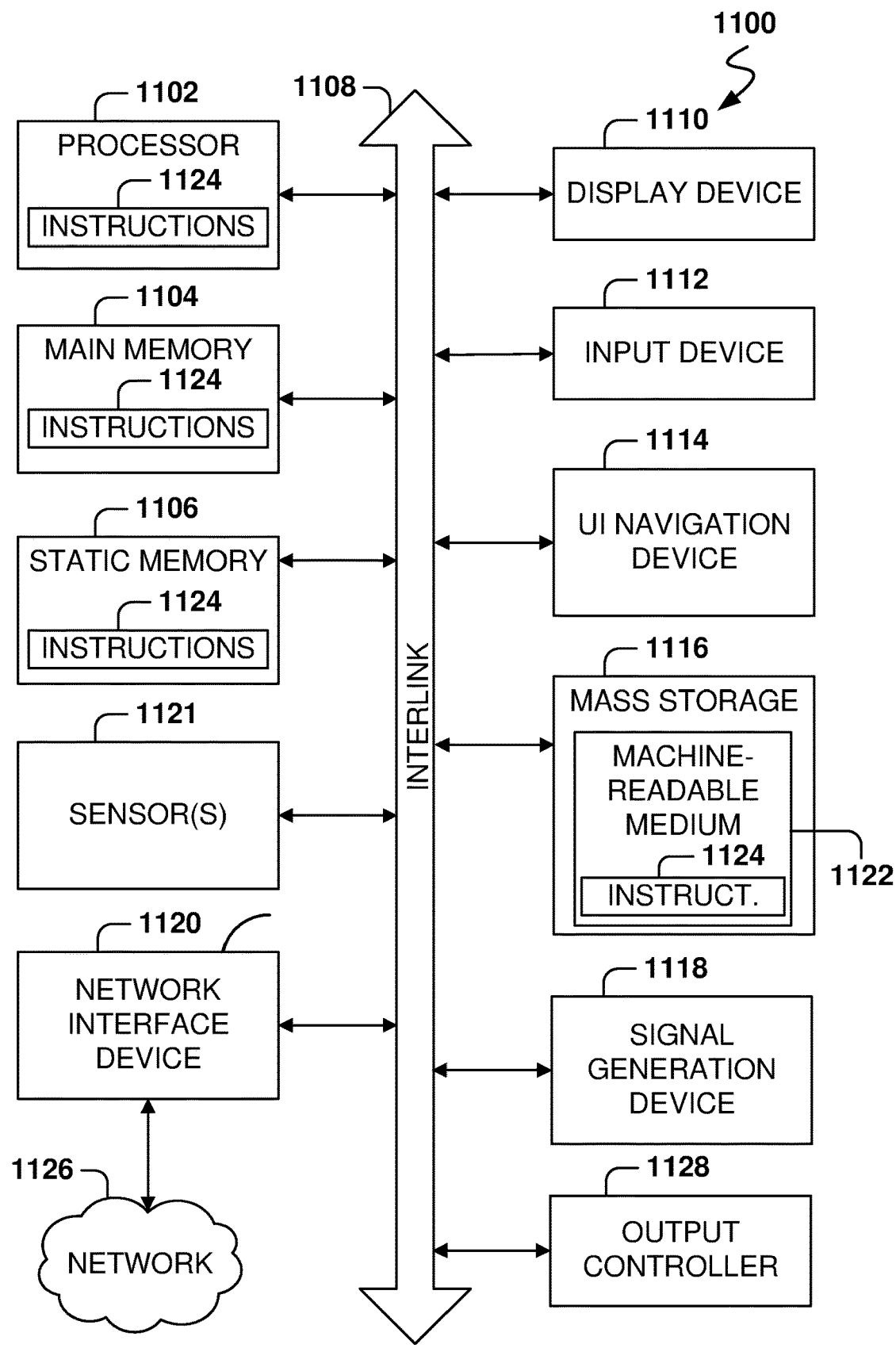
FIG. 11 is a block diagram illustrating an example of a machine upon which one or more example embodiments may be implemented.

FIG. 11 is a block diagram illustrating an example of a machine upon which one or more example embodiments may be implemented. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, SaaS, or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a graphics processing unit (GPU), a hardware processor core, or any combination thereof), a main memory 1104, and a static memory 1106, some or all of which may communicate with each other via an interlink (e.g., bus) 1108. The machine 1100 may further include a display device 1110, an alphanumeric input device 1112 (e.g., a keyboard), and a UI navigation device 1114 (e.g., a mouse). In an example, the display device 1110, input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a global positioning system (GPS) sensor, compass, accelerometer, or another sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1102.11 family of standards known as Wi-Fi®, IEEE 1102.16 family of standards known as WiMax®), IEEE 1102.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   training, by one or more first processors, a community predictor with community training data to produce a trained community predictor, the community training data comprising values of features derived from previously reconciled transactions of a plurality of businesses;
   training, by one or more second processors, a user predictor with user training data to produce a trained user predictor, the user training data comprising values derived from features for previously reconciled transactions of a first entity;
   providing a machine learning tool for determining reconciliation suggestions based on previously reconciled transactions for the plurality of businesses and previously reconciled transactions of the first entity, the machine learning tool comprising the trained community predictor and the trained user predictor;
   presenting the reconciliation suggestions determined by the machine learning tool to a user for validation via a user interface; and
   re-training the user predictor with user training data including the validated reconciliation suggestion.

2. The method of claim 1, further comprising:
   configuring the community predictor to determine a community suggestion confidence level associated with each reconciliation suggestion determined by the community predictor in respect of a first transaction to be reconciled;
   configuring the user predictor to determine a user suggestion confidence level associated with each reconciliation suggestion determined by the user predictor in respect of the first transaction, wherein each reconciliation suggestion is associated with a confidence level based on the community suggestion confidence level and the user suggestion confidence level; and
   configuring the machine learning tool to determine a best suggestion for reconciling the first transaction, wherein the best suggestion corresponds to a highest confidence level.

3. The method of claim 2, further comprising:
   configuring the machine learning tool to:
      responsive to the confidence level of the best suggestion not exceeding a predetermined first threshold:
         present in a user interface one or more suggestions for reconciling the first transaction as determined by the user predictor or the community predictor;
         receive, through the user interface, a user designation of a reconciliation suggestion from the one or more suggestions for manually reconciling the first transaction; and
         reconcile the first transaction with the user designation of the reconciliation suggestion; and
      responsive to the confidence level of the best suggestion exceeding the predetermined first threshold, automatically reconcile the first transaction with the determined best suggestion.

4. The method of claim 3, wherein each suggestions comprises one or more of: a name of a second entity in the first transaction, and an account in an accounting system associated with the first transaction.

5. The method of claim 3, wherein reconciling the first transaction with the user designation of the reconciliation suggestion further comprises re-training the user predictor with user training data comprising the first transaction and the user designated reconciliation suggestion.

6. The method of claim 1, further comprising:
   identifying features for reconciling transactions in bank statements of a first entity with corresponding accounts in an accounting system, the features comprising one or more of: a name of a second entity associated with the transaction, and an account associated with the transaction.

7. The method of claim 6, wherein the features for reconciling transactions further comprise one or more of: a description of the transaction, a location of the first entity, an industry of the first entity, a location of the second entity, a tax rate of the transaction, an account identifier, an account name associated with the account identifier, an invoice identifier, and a bill identifier.

8. The method of claim 1, wherein the user training data or the community training data is segmented for a plurality of geographical regions, and wherein the machine learning tool is configured to reconcile transactions for one of the plurality of geographical regions.

9. The method of claim 1, further comprising:
   receiving, by one or more third processors of an accounting system, a first transaction in a first bank statement, the first transaction relating to a user;
   inputting, by the one or more third processors of the accounting system, the first transaction to the machine learning tool;
   determining, by the community predictor, one or more first suggestions for reconciling the first transaction and a first confidence level corresponding to each of the one or more first suggestions;
   determining, by the user predictor, one or more second suggestions for reconciling the first transaction and a second confidence level corresponding to each of the one or more second suggestions; and
   determining, by the machine learning tool, a best suggestion corresponding to a highest confidence level of the first confidence level and the second confidence level of the one or more first suggestions and second suggestions, respectively.

10. The method of claim 9, further comprising:
    responsive to the highest confidence level of the best suggestion for reconciling the first transaction not exceeding a predetermined first threshold, causing, by the one or more third processors of the accounting system, presentation in a user interface of one or more suggestions from the one or more first suggestions and the one or more second suggestions; and
    responsive to the highest confidence level of the best suggestion exceeding the predetermined first threshold, automatically reconciling the first transaction with the determined best suggestion.

11. The method of claim 10, further comprising:
    receiving through the user interface, a user designated reconciliation suggestion from the one or more suggestions for manually reconciling the first transaction; and
    reconciling the first transaction with the user designated reconciliation suggestion.

12. The method of claim 11, further comprising:
re-training, by the one or more first processors, the user predictor with training data comprising the first transaction and the user designated reconciliation suggestion.

13. The method of claim 9, wherein the one or more third processors are the same as the first one or more processors or the second one or more processors.

14. The method of claim 1, wherein the one or more first processors are the same as the one or more second processors.

15. A method comprising:
receiving, by one or more processors of an accounting system, a first transaction in a first bank statement associated with a first entity;
inputting, by the one or more processors of the accounting system, the first transaction to a machine learning tool, the machine learning tool comprising:
a community predictor configured to determine one or more first suggestions for reconciling the first transaction, the community predictor having been trained on community training data comprising values of features derived from previously reconciled transactions of a plurality of businesses; and
a user predictor configured to determine one or more second suggestions, the user predictor having been trained on user training data comprising values derived from features for previously reconciled transactions of the first entity;
determining, by the community predictor, one or more first suggestions for reconciling the first transaction and a first confidence level corresponding to each of the one or more first suggestions;
determining, by the user predictor, one or more second suggestions for reconciling the first transaction and a second confidence level corresponding to each of the one or more second suggestions wherein each suggestion is associated with a confidence level based on the first confidence level and the second confidence level;
determining, by the machine learning tool, a best suggestion corresponding to a highest confidence level of the one or more first suggestions and second suggestions, respectively;
presenting the one or more first suggestions and the one or more second suggestions to a user for validation via a user interface; and
re-training the user predictor with user training data including the validated reconciliation suggestion.

16. The method of claim 15, further comprising:
responsive to the confidence level of the best suggestion for reconciling the first transaction not exceeding a predetermined first threshold, causing, by the one or more processors, presentation in a user interface of one or more suggestions from the one or more first suggestions and the one or more second suggestions; and
responsive to the confidence level of the best suggestion exceeding the predetermined first threshold, automatically reconciling the first transaction with the determined best suggestion.

17. The method of claim 16, further comprising:
receiving through the user interface, a user designated reconciliation suggestion from the one or more suggestions for manually reconciling the first transaction; and
reconciling the first transaction with the user designated reconciliation suggestion.

18. A system comprising:
a memory comprising instructions; and
one or more first processors, wherein the instructions, when executed by the one or more first processors, cause the one or more first processors to perform operations comprising:
training, by one or more first processors, a community predictor with community training data to produce a trained community predictor, the community training data comprising values of features derived from previously reconciled transactions of a plurality of businesses;
training, by the one or more first processors, a user predictor with user training data to produce a trained user predictor, the user training data comprising values derived from the features for previously reconciled transactions of a first entity;
providing a machine learning tool for determining reconciliation suggestions based on previously reconciled transactions for the plurality of businesses and previously reconciled transactions of the first entity, the machine learning tool comprising the trained community predictor and the trained user predictor;
providing a user interface for presenting the reconciliation suggestions determined by the machine learning tool to a user for validation; and
re-training the user predictor with user training data including the validated reconciliation suggestion.

19. The system as recited in claim 18, wherein the one or more first processors are configured to perform operations comprising:
identifying features for reconciling transactions in bank statements of a first entity with corresponding accounts in an accounting system,
wherein the features comprise one or more of a name of: a second entity associated with the transaction, an account associated with the transaction, a description of the transaction, a location of the first entity, an industry of the first entity, a location of the second entity, a tax rate of the transaction, an account identifier, an account name associated with the account identifier, an invoice identifier, and a bill identifier.

20. A non-transitory machine-readable storage medium including instructions that, when executed by a machine, cause the machine to perform operations comprising:
training, by one or more first processors, a community predictor with community training data to produce a trained community predictor, the community training data comprising values of features derived from previously reconciled transactions of a plurality of businesses;
training, by the one or more first processors, a user predictor with user training data to produce a trained user predictor, the user training data comprising values derived from the features for previously reconciled transactions of a first entity;

providing a machine learning tool for determining reconciliation suggestions based on previously reconciled transactions for the plurality of businesses and previously reconciled transactions of the first entity, the machine learning tool comprising the trained community predictor and the trained user predictor;

presenting the reconciliation suggestions determined by the machine learning tool to a user for validation via a user interface; and re-training the user predictor with user training data including the validated reconciliation suggestion.

* * * * *